United States Patent Office 3,448,140
Patented June 3, 1969

3,448,140
PROCESS FOR MANUFACTURING URETHANES FROM ALCOHOLS AND PHENOLS, CARBON MONOXIDE AND NITRO COMPOUNDS IN THE PRESENCE OF TRANSITION METAL COMPLEXES
George Albert Gamlen, Runcorn, and Arthur Ibbotson, Manchester, England, assignors to Imperial Chemical Industries Limited, London, England, a corporation of Great Britain
No Drawing. Filed Mar. 14, 1966, Ser. No. 533,808
Claims priority, application Great Britain, Mar. 18, 1965, 11,565/65; Sept. 17, 1965, 39,723/65
Int. Cl. C07c 101/00, 101/02
U.S. Cl. 260—471   12 Claims

ABSTRACT OF THE DISCLOSURE

A process for the manufacture of urethanes by reacting an organic compound containing at least one hydroxyl group with carbon monoxide and a nitrogenous organic compound containing at least one non-cyclic group in which a nitrogen atom is directly attached to a single carbon atom and is also attached through a double bond to an oxygen or another nitrogen atom, in the presence of a complex compound of a transition metal having an atomic number in the ranges 21–29, 39–47 and 71–79 inclusive characterized by the presence in the molecule of one or more mono- or poly-dentate ligands in which at least one of the electron-donating atoms is an atom of phosphorus, arsenic or antimony containing a lone pair of electrons. Preferably, the nitrogenous compound is a nitro compound and the process is carried out in the presence of a salt of a transition metal.

---

This invention relates to the preparation of urethanes.

In our U.S. Patent 3,338,956 a process has been proposed for the manufacture of urethanes by reacting hydroxyl group-containing organic compounds, such as alcohols or phenols, with carbon monoxide and certain nitrogenous organic compounds, such as nitro-compounds. It has also been proposed to carry out this process in the presence as catalysts of metal carbonyls.

It has now been found that the process of the above-mentioned patent may be performed with improved yield and reproducibility by conducting it in the presence of certain metal complex compounds containing phosphorus, arsenic or antimony.

According to the present invention there is provided a process for the manufacture of urethane by reacting an organic compound containing at least one hydroxyl group with carbon monoxide and a nitrogenous organic compound containing at least one non-cyclic group in which a nitrogen atom is directly attached to a single carbon atom and is also attached through a double bond to an oxygen or another nitrogen atom, in the presence of a complex compound of a transition metal as hereinafter defined characterised by the presence in the molecule of one or more mono- or poly-dentate ligands in which at least one of the electron-donating atoms is an atom of phosphorus, arsenic or antimony containing a lone pair of electrons.

By the term "transition metal" there is meant a metal having an atomic number in the ranges 21–29, 39–47 and 71–79 inclusive.

The term "mono- or poly-dentate ligands" is intended to signify complexing groups or molecules which contain one or more positions through which bonds with the metal may be formed.

Hydroxy compounds suitable for use in the process of the present invention may be, for example, mono or polyhydric alcohols containing primary, secondary or tertiary hydroxyl groups as well as mono- and polyhydric phenols. Mixtures of these hydroxy compounds may also be used. The alcohols may be aliphatic or aromatic and may bear other substituents in addition to hydroxyl groups but the substituents should, except as hereinafter described, preferably be non-reactive to carbon monoxide under the reaction conditions.

Generally the hydroxyl group-containing compounds conform with one or other of the general formulae $R(OH)_n$ and $R'(OH)_n$ wherein $n$ is 1 or more and preferably from 1 to 3, R is an optionally substituted aliphatic, cycloaliphatic or araliphatic group preferably containing from 1 to 20 carbon atoms, R' is an aromatic group containing one or more benzenoid rings and preferably not more than 3 rings which may be fused or joined by single valency bonds, directly or through bridging groups which may be, for example, oxygen or sulphur atoms or sulphoxide, sulphone or carbonyl groups, or alkylene groups in which, if desired, the carbon chain may be interrupted by, for example, oxygen or sulphur atoms, sulphoxide, sulphone or carbonyl groups, for example methylene, oxymethylene, dimethylene sulphone or dimethylene ketone groups.

The group R may be alkyl, cycloalkyl, alkylene, cycloalkylene or aralkyl and the main carbon chain may if desired be interrupted, for example, by oxygen or sulphur atoms, sulphoxide, sulphone, carbonyl or carboxylic ester groups. The main chain may bear as substituents, for example, alkyl, alkoxy, aryl or aryloxy groups normally containing less than 10 carbon atoms. Especially suitable compounds of the formula $R(OH)_n$ are monohydric alcohols such as methyl, ethyl, n-, iso-, sec- and tert-butyl, amyl, hexyl, lauryl, n- and sec-propyl, cetyl, benzyl, chlorobenzyl and methoxybenzyl alcohols as well as diols such as ethylene glycol, diethylene glycol, propylene glycol and dipropylene glycol, triols such as glycerol, trimethylol propane, hexanetriol, tetrols such as pentaerythritol and the ethers of such polyols providing that at least one OH group remains unetherified. The etherifying group in such ether alcohols normally contains up to 10 carbon atoms and is preferably an alkyl, cycloalkyl or aralkyl group which may be substituted, for example, a halogeno alkyl group. An especially suitable compound of the formula $R(OH)_n$ is methanol but other preferred compounds are ethanol, propanol, butanol, ethylene glycol, glycerol and trimethylol propane.

The phenolic compounds of the general formula $R(OH)_n$ may carry substituents in the benzenoid rings, for example, alkyl and alkoxy groups containing up to 10 carbon atoms and halogen atoms. Suitable mono and polyhydric phenols include phenol, chlorophenol, methyl, ethyl, butyl and alkyl phenols, catechol, resorcinol, quinol, 4,4'-dihydroxydiphenylmethane, naphthols, chloronaphthols, methyl, ethyl, butyl and octyl naphthols, anthranols, chloroanthranols, methyl, ethyl, butyl and octyl anthranols, phenanthrols, chlorophenanthrols, methyl, ethyl, butyl and octyl phenanthrols, pyrogallol, phloroglucinol, hydroxyquinol and the ethers of the polyhydroxyphenols providing at least one OH remains unetherified. The etherifying group in such ethers normally contains up to 10 carbon atoms and is preferably an alkyl, cycloalkyl or aralkyl group which may be substituted, for example, a halogenoalkyl group. Among the above mentioned aromatic compounds phenol, chlorophenol, octylphenol, 4,4'-dihydroxydiphenylmethane, naphthols, anthranols and phenanthrols are particularly preferred and especially phenol itself.

As suitable nitrogenous compounds containing at least one non-cyclic group in which a nitrogen atom is directly attached to a single carbon atom and through a double bond to oxygen or another nitrogen atom we mention organic nitro, nitroso, azo and azoxy compounds, of which organic nitro compounds are generally preferred.

As examples of nitro compounds for use in the process we mention mononitro compounds such as nitrobenzene, alkyl and alkoxy nitrobenzenes wherein the alkyl group contains up to 10 carbon atoms, aryl and aryloxy nitrobenzenes, wherein the aryl group is phenyl, tolyl, xylyl, naphthyl, chlorophenyl, chlorotolyl, chloroxylyl or chloronaphthyl, chloronitrobenzenes, dinitro compounds such as dinitrobenzene, alkyl and alkoxy dinitrobenzenes wherein the alkyl group contains up to 10 carbon atoms, aryl and aryloxy dinitrobenzenes wherein the aryl group is any of those mentioned above, chlorodinitrobenzenes, trinitrocompounds such as trinitrobenzene, alkyl and alkoxytrinitrobenzenes, aryl and aryloxytrinitrobenzenes, the substituents being any of those already mentioned and chlorotrinitrobenzenes as well as similarly substituted mono and polynitro derivatives of the naphthalene, diphenyl, diphenylmethane, anthracene and phenanthrene series. Substituted or unsubstituted aliphatic nitro compounds such as nitromethane, nitroethane, nitropropane, nitrobutane, 2,2-dimethyl nitrobutane, nitrocyclopentane, nitrocyclohexane, nitrocyclobutane, 3-methylnitrobutane, nitrooctadecane, 3-nitropropene-1, phenyl nitromethane, p-bromophenyl nitromethane, p-nitrophenyl nitromethane, p-methoxy phenyl nitromethane, dinitroethane, dinitropropane, dinitrobutane, dinitrohexane, dinitrodecane, dinitrocyclohexane, dinitromethylcyclohexane, di-(nitrocyclohexyl)-methane are also suitable. From this group of nitro compounds nitrobenzene, nitrotoluene, dinitrobenzene, dinitrotoluene, trinitrobenzene, trinitrotoluene, mononitronaphthalene, dinitronaphthalene, 4,4'-dinitrodiphenylmethane, nitrobutane, nitrocyclohexane, p-nitrophenylnitromethane, dinitrocyclohexane, dinitromethylcyclohexane, dinitrocyclohexylmethane, are preferred and in particular aromatic nitro compounds especially 2,4- and 2,6-dinitrotoluenes and meta- and para-dinitrobenzenes.

Examples of suitable nitroso compounds are the aromatic nitrosocompounds such as nitrosobenzene, nitrosotoluene, dinitrosobenzene, dinitrosotoluene and the aliphatic nitroso compounds such as nitrosobutane, nitrosocyclohexane and dinitrosomethylcyclohexane.

Suitable azo compounds have the general formula $R_1-N=N-R_2$, wherein $R_1$ and $R_2$ may be either the same or different substituted or unsubstituted alkyl or aryl groups selected from amongst those already listed in the description of suitable nitro compounds. Azobenzene, nitroazobenzene, chloroazobenzene and alkyl or aryl substituted azobenzenes are particularly preferred.

Suitable azoxy compounds have the general formula

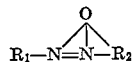

wherein $R_1$ and $R_2$ may be the same or different substituted or unsubstituted alkyl or aryl groups selected from amongst those already listed in the description of suitable nitro compounds. Azoxybenzene, nitroazoxybenzene, chloroazoxybenzene, alkyl and aryl substituted azoxybenzenes are particularly preferred.

The invention includes the use of any mixture of nitrocompounds, nitroso compounds, azo or azoxy compounds with any mixture of hydroxy compounds and also the use of compounds containing both functions, i.e. hydroxynitro compounds, hydroxy nitroso compounds, hydroxyazo and hydroxyazoxy compounds such as 2-hydroxynitroethane, 2-hydroxynitrosoethane, nitrophenols, nitro naphthols, nitrosophenols, nitrosonaphthols, hydroxyazobenzenes and hydroxyazoxybenzenes. Mixtures of these nitrogen-containing compounds may also be used.

The process of the invention has been found to proceed most smoothly to give the highest yields when employing nitro compounds. It is accordingly preferred to use nitro compounds rather than nitroso, azo or azoxy compounds.

The complex compounds of the transition metals as hereinbefore defined which are suitable as catalysts in the process of the present invention include complex compounds as hereinbefore defined of copper, gold, mercury, titanium, vanadium, chromium, molybdenum, tungsten, manganese, iron, cobalt, nickel, ruthenium, rhodium, osmium and iridium. Particularly preferred complex compounds are those in which the metal is rhodium, platinum, palladium, molybdenum or iron. The complex compounds may contain one or more atoms of the said metals in the molecule and, when more than one such atom is present, the metals may be the same or different. The mono- or poly-dentate ligands which are present in the the molecule of the complex compounds and in which at least one of the electron-donating atoms is an atom of phosphorus, arsenic or antimony containing a lone pair of electrons may be, for example, organo-phosphines, -arsines and -stibines. Suitable mono-dentate ligands include alkyl phosphines such as trimethylphosphine and tributylphosphine, aryl-phosphines such as triphenylphosphine, mixed alkylaryl phosphines such as diethylphenylphosphine and radicals derived from such phosphines, for example the radical having the formula $-P(CH_3)_2$. Hydrocarbyloxy phosphines, i.e. phosphites, such as triphenyl phosphite, or trifluorophosphine may also be employed. Suitable polydentate ligands include tetramethyl diphosphine and tetraphenyl diphosphinoethane. Exactly analogous derivatives of arsenic and antimony may be used; however, because of their greater ease of preparation and stability of the derived complexes, the hydrocarbyl derivatives of phosphorus are preferred.

The complex compounds suitable for use in the process of the present invention contain in the molecule, in addition to the ligands discussed above, one or more other atoms, groups or molecules which are chemically bonded to the metal atom or atoms. Atoms which may be bonded to the metal include, for example, hydrogen, nitrogen and halogen atoms; groups which may be bonded to the metal include, for example, hydrocarbyl, hydrocarbyloxy, carbonyl, nitrosyl, cyano and $SnCl_3^-$ groups; molecules which may be bonded to the metal include, for example, organic isocyanides and isothiocyanates.

Examples of suitable complex compounds are those represented by the following formulae:

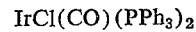
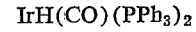
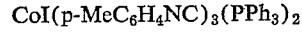

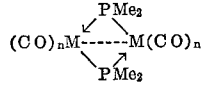

where $n=4$ if M=Mo, $n=3$ if M=Fe

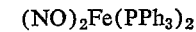
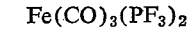
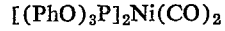
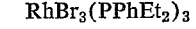
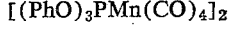
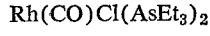
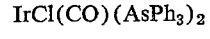
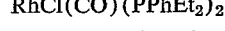
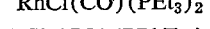
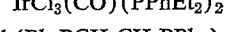
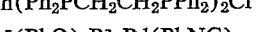
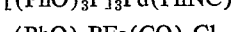
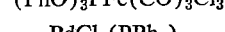
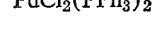

$(PhO)_3PCo(NO)(CO)_2$ $Ni(CO)_3PF_3$ $Rh[(PhO)_3P]_3Cl$ $(SbPr_3^n)_2PdCl_2$ $PtCl_2(p\text{-}ClC_6H_4PBu_2^n)_2$ Other examples of suitable complex compounds are those which are represented by the following formulae and are described in the following copending applications: Taylor Ser. No. 545,522, filed Apr. 21, 1966, Thompson Ser. No. 561,691, filed June 30, 1966, Thompson Ser. No. 561,760, filed June 30, 1966, and O'Brien Ser. No. 572,221, filed Aug. 15, 1966.

$Ir(CO)(Ph_2PCH_2CH_2PPh_2)_2Cl$ $Ir(Ph_2PCH_2CH_2PPh_2)_2Cl$ $IrH_2(Ph_2PCH_2CH_2PPh_2)_2Cl$

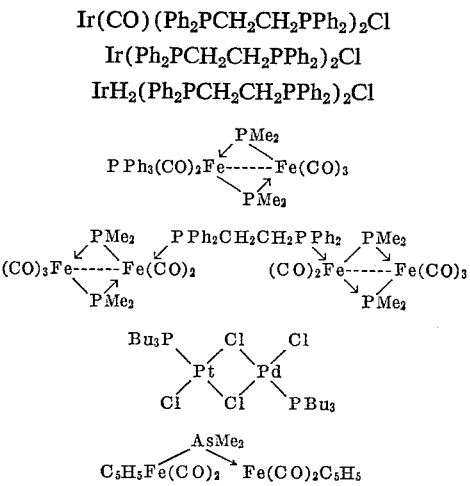

The complex compounds employed as catalysts in the process of the invention may be introduced into the reaction mixture as such, or they may be formed in situ from a suitable metal compound and the desired ligand.

The complex compounds may conveniently be used in amounts of 0.01 to 5% preferably 0.5 to 2% by weight of the nitrogenous organic compound to be reacted, although larger amounts than these may be employed if high reaction rates are desired, and even smaller amounts if very high pressures are used.

The process of the invention is conveniently carried out at super-atmospheric pressure, for example at between 50 and 500 atmospheres, through higher or lower reaction pressures may be employed if the other reaction conditions are suitably adjusted. Reaction temperatures of up to 250° C. may be employed, but it is preferred to operate in the range 100° to 175° C. in order to achieve a convenient rate of reaction whilst obviating undesirable side-reactions.

The process may be operated continuously or in a batch-wise manner, and the catalyst may be employed either in the pure state or supported on a suitable substrate such as alumina or kieselguhr.

In carrying out the process of the present invention, it is preferred to incorporate into the reaction mixture, in addition to one of the complex compounds described above, a metal, or a salt of a metal, selected from those metals which have the property of existence in two or more valency states. Examples of multivalent metals and their salts which are suitable as co-catalysts for the process of the invention include the metals and their respective salts of Groups VI, VII and VIII of the periodic classification, as well as gold, mercury, cerium, thallium, titanium, zirconium, copper, tin, lead, vanadium, niobium and tantalum. A particularly suitable metal is iron; particularly suitable metal salts include ferrous and ferric chloride, palladium chloride, chromium chloride, cuprous chloride, stannous chloride and stannous octoate. The preferred metal salts are ferrous chloride and ferric chloride.

The metals or salts of metals may conveniently be employed in amounts of from 1 to 15%, preferably 2 to 6%, by weight of the nitrogenous compound to be reacted. They may be introduced into the reaction mixture at any stage of the reaction but are preferably introduced at he commencement of the reaction.

If desired, the process of the invention may be carried out in the presence of inert diluents, preferably those in which the non-gaseous reactants are soluble. Suitable inert diluents include aliphatic or aromatic hydrocarbons such as n-pentane or toluene, halogenated hydrocarbons such as 1,1,2,-trichloro-1,2,2,-trifluoroethane, ketones, esters, ethers and cyclic ethers. The process may also be operated using excess of either the hydroxy compound or the nitrogeneous compound.

The invention is useful for the preparation of compounds which contain one or more urethane groups and which may be monomeric or polymeric in nature. Thus the reaction may be adopted for the preparation of monourethanes from mononitro compounds, nitroso compounds, azo compounds or azoxy compounds and monohydroxy compounds and for the preparation of polyurethanes from polynitro compounds, polynitroso, nitro or nitroso substituted azo or azoxy compounds and monofunctional hydroxy compounds. The urethane products of the process of this invention, in particular those urethanes containing not more than three urethane groups per molecule, may be converted to the corresponding isocyanates for example by heating or other methods fully described in the prior art.

Additionally polyurethane polymers may be obtained by the interaction of polynitro, polynitroso or nitro substituted azo or azoxy compounds with polyols and carbon monoxide. Thus linear polyurethanes, useful for example as fibres or elastomers, may be obtained directly, for example, from diols, dinitro compounds and carbon monoxide or from hydroxynitro compounds and carbon monoxide, whilst crosslinked polyurethane polymers, useful for example as flexible or rigid plastics, may be obtained from, for example, mixture of di- or polynitro compounds, diols or polyols and carbon monoxide.

The invention is illustrated but not limited by the following examples in which parts are by weight:

EXAMPLE 1

Use of iridium chlorcarbonyl bis-triphenyl phosphine as catalyst

Nitrobenzene (10.0 parts) and methanol (32 parts) are heated at 150° C. in an agitated pressure vessel under a carbon monoxide atmosphere (initially at 80 atmospheres pressure, rising to a maximum of 106 atmospheres) for 10 hours in the presence of iridium chlorcarbonyl bis-triphenylphosphine, $IrCl(CO)(PPh_3)_2$ (0.1 part) and ferric chloride (0.5 part).

Analysis of the reaction product by gas liquid chromatography shows it to contain 0.9 part of methyl carbanilate.

EXAMPLES 2–16

Use of other catalysts

The procedure of Example 1 is repeated using in place of the iridium chlorcarbonyl bis-triphenylphosphine (0.1 part) a like amount of one of the following catalysts:

| Example No. | Catalyst | Methyl carbanilate obtained |
|---|---|---|
| 2 | $Ir(Ph_2PCH_2CH_2PPh_2)_2Cl$ | 4.2 |
| 3 | $IrH(CO)(PPh_3)_2$ | 1.9 |
| 4 | $Rh(Ph_2PCH_2CH_2PPh_2)_2Cl$ | 2.6 |
| 5 | $RhCl(CO)(PEtPh_2)_2$ | 6.8 |
| 6 | $RhBr_3(PPhEt_2)_3$ | 2.5 |
| 7 | $IrCl_3(CO)(PPhEt_2)_2$ | 1.2 |
| 8 | $PdCl_2(PPh_3)_2(trans)$ | 8.2 |
| 9 | $PtCl_2(p\text{-}ClC_6H_4PBu_2^n)_2$ | 4.3 |
| 10 | $[PMe_2Fe(CO)_3]_2$ | 2.7 |
| 11 | $[PMe_2Mo(CO)_4]_2$ | 2.8 |
| 12 | $(n\text{-}Bu_3P)_2PtPdCl^4$ | 5.7 |
| 13 | $(PPh_3)(CO)_5Fe_2(PMe_2)_2$ | 5.6 |
| 14 | $RhCl(CO)(PEt_3)_2$ | 10.3 |
| 15 | $RhCl(CO)(AsEt_3)_2$ | 9.4 |

We claim:
1. A process for the manufacture of urethanes by reacting a hydroxyl group-containing organic compound selected from the group consisting of alcohols and phenols with carbon monoxide and a nitrogenous organic compound selected from the group consisting of nitroalkanes and aromatic-nitro compounds at a pressure of between 50 and 500 atmospheres and at a temperature of up to 250° C., in the presence of:
  a complex compound of at least one transition metal having an atomic number in the ranges 21–29, 39–47 and 71–79 inclusive, the said complex compound being characterized by the presence in the molecule of at least one mono- or poly-dentate ligand which is selected from the group consisting of saturated alkyl, aryl and halogen substituted aryl derivatives of phosphorus, arsenic and antimony and alkylene bridged cogeners of such derivatives
  and at least one salt of a transition metal having an atomic number in the ranges 21–29, 39–47 and 71–79 inclusive.

2. A process as claimed in claim 1, wherein the hydroxyl group containing compound is methanol.

3. A process as claimed in claim 1, wherein the organic nitro compound is nitrobenzene.

4. A process as claimed in claim 1, wherein the complex compound of a transition metal is a complex compound of rhodium characterized by the presence in the molecule of at least one mono- or poly-dentate ligand which is selected from the group consisting of saturated alkyl, aryl and halogen substituted aryl derivatives of phosphorus, arsenic and antimony and alkylene bridged cogeners of such derivatives.

5. A process as claimed in claim 1, wherein the complex compound of a transition metal is a complex compound of platinum characterized by the presence in the molecule of at least one mono- or poly-dentate ligand which is selected from the group consisting of saturated alkyl, aryl and halogen substituted aryl derivatives of phosphorus, arsenic and antimony and alkylene bridged cogeners of such derivatives.

6. A process as claimed in claim 1, wherein the complex compound of a transition metal is a complex compound of palladium characterized by the presence in the molecule of at least one mono- or poly-dentate ligand which is selected from the group consisting of saturated alkyl, aryl and halogen substituted aryl derivatives of phosphorus, arsenic and antimony and alkylene bridged cogeners of such derivatives.

7. A process as claimed in claim 1, wherein the complex compound of a transition metal is a complex compound of molybdenum characterized by the presence in the molecule of at least one mono- or poly-dentate ligand which is selected from the group consisting of saturated alkyl, aryl and halogen substituted aryl derivatives of phosphorus, arsenic and antimony.

8. A process as claimed in claim 1, wherein the complex compound of a transition metal is a complex compound of iron characterized by the presence in the molecule of at least one mono- or poly-dentate ligand which is selected from the group consisting of saturated alkyl, aryl and halogen substituted aryl derivatives of phosphorus, arsenic and antimony and, alkylene bridged cogeners of such derivatives.

9. A process as claimed in claim 1, wherein the complex compound of a transition metal contains in the molecule, in addition to the mono- or poly-dentate ligand, at least one other atom, group or molecule which is chemically bonded to the metal atom selected from the group consisting of hydrogen, nitrogen and halogen atoms, hydrocarbyl, hydrocarbyloxy, carbonyl, nitrosyl, cyano and $SnCl_3$ groups and organic isocyanides and isothiocyanates.

10. A process as claimed in claim 1, wherein the complex compound is used in an amount of from 0.01% to 5% by weight of the nitrogenous organic compound to be reacted.

11. A process as claimed in claim 1, wherein the salt of the transition metal is ferric chloride.

12. A process as claimed in claim 1, wherein the salt of the transition metal is used in an amount of from 1% to 15% by weight of the nitrogenous organic compound to be reacted.

References Cited
UNITED STATES PATENTS 3,245,774   4/1966   Bachmann _____ 260—471

LORRAINE A. WEINBERGER, *Primary Examiner.*

L. ARNOLD THAXTON, *Assistant Examiner.*

U.S. Cl. X.R.

252—431, 437; 260—77.5, 468, 479, 482